US006146133A

United States Patent [19]
Erhard et al.

[11] Patent Number: 6,146,133
[45] Date of Patent: Nov. 14, 2000

[54] PROCESS FOR THE RECYCLING OF RESIDUES FOR THE PRODUCTION OF PORTLAND CEMENT CLINKER

[75] Inventors: Helmut S. Erhard, Wiesloch; Volker Schneider, Triefenstein-Lengfurt; Paul Korf, Everswinkel, all of Germany

[73] Assignee: Heidelberger Zement AG, Heidelberg, Germany

[21] Appl. No.: 09/147,348

[22] PCT Filed: May 17, 1997

[86] PCT No.: PCT/EP97/02539

§ 371 Date: Jan. 29, 1999

§ 102(e) Date: Jan. 29, 1999

[87] PCT Pub. No.: WO97/46496

PCT Pub. Date: Dec. 11, 1997

[30] Foreign Application Priority Data

Jun. 5, 1996 [DE] Germany ............................ 196 22 591

[51] Int. Cl.[7] .................................................... F27B 15/00
[52] U.S. Cl. ................................. 432/14; 106/771; 34/135
[58] Field of Search ........................... 432/13, 14, 105, 432/108; 34/135, 136, 137, 435, 443; 106/739, 740, 751, 771; 110/246

[56] References Cited

U.S. PATENT DOCUMENTS

| 5,199,987 | 4/1993 | Ernstbrunner | 106/761 |
| 5,392,721 | 2/1995 | Judd | 110/246 |
| 5,456,024 | 10/1995 | Klausmann et al. | 34/135 |
| 5,614,016 | 3/1997 | Hundebol | 432/14 |
| 5,669,969 | 9/1997 | Meade et al. | 106/745 |
| 5,711,802 | 1/1998 | Theil | 432/14 |

FOREIGN PATENT DOCUMENTS

| 394 711 | 6/1992 | Australia . |
| 0 488 989 B1 | 8/1995 | European Pat. Off. . |
| 40 22 181 A1 | 1/1992 | Germany . |

*Primary Examiner*—Denise L. Ferensic
*Assistant Examiner*—Gregory A. Wilson
*Attorney, Agent, or Firm*—Foley and Lardner

[57] ABSTRACT

The present invention concerns a process for the production of cement clinker in rotary kilns with substitution of primary raw materials and fuels by use of residual materials containing minerals and combustible parts with moisture contents of up to about 65% without predrying. The process makes possible a material and/or thermal utilisation of residual materials in the case of saving of the clay and fuel sources and relief of dumping with simultaneous lowering of the emissions, above all $NO_x$, in the cement rotary kiln.

3 Claims, 2 Drawing Sheets

PROCESS FOR THE RECYCLING OF RESIDUES FOR THE PRODUCTION OF PORTLAND CEMENT CLINKER

BACKGROUND OF THE INVENTION

1. Field of the Invention

The invention describes a new process for the material and thermal utilisation of residual materials containing water, minerals and combustible parts, especially from the paper industry, in cement kilns, for the production of Portland cement clinker.

2. Description of Related Art

In a series of industrial processes, sludges are produced in comparatively large amounts as waste which contain comparatively large amounts of water (30–70%), combustible organic substances (10–30%) and mineral filling materials, especially clay, silicate and lime (10–50%). Typical examples herefor is the waste sludge obtained in the recycling of waste paper or lacquers. Since a further processing of such products is, in most cases, not possible, it is necessary either to dump or burn them, whereby a high portion of ash is again obtained which must be dumped. The high portion of water is extremely disturbing for both processes so that, in the past, these residual materials had to be dried, often with high investment expense. However, the general shortage and expense of dumping possibilities and the dissipation of the residual minerals contained in the sludge wastes and the thermal energy contained in the organic components obliges one to look for a process to utilise such materials in another way.

By way of example, the production of paper is referred to. The clay-containing materials used in the case of paper production as filling material and for the surface coating remain behind in the working up of waste paper, together with fine-fibred cellulose, as residual material. This corresponds to the following average composition:

| | |
|---|---|
| dry substance | about 35–65% |
| water | about 65–35% |
| mineral portion | about 10–30% |
| combustible portion | about 10–35% |
| calorific value | about 3000–4000 kJ/kg. |

A material and thermal utilisation of worthwhile amounts of such undried and untreated paper residual materials hitherto failed because of suitable processes and devices which make possible an economic and environmentally compatible utilisation. Therefore, the residual materials must be pre-dried, with high investment cost, to a residual water content of 10–30%.

Therefore, the task arises to find a process by means of which one can further work up residual materials containing water, mineral and combustible portions without previous drying and without the production of wastes to be dumped to give a usable end product.

SUMMARY OF THE INVENTION

This task is solved by a process for the production of Portland cement clinker in cement kilns and for the material and thermal utilization of residual materials containing water, minerals and combustible parts. The process includes: introducing, without previous drying, the residual materials into a cement plant with a conveyor into a shaft between a clinker cooler and a kiln head; taking up the residual materials by secondary air having a temperature of about 800–1000° C. air and conveying the residual materials to the kiln; and introducing the taken up residual materials into the kiln, wherein the residual materials have a content of 65–35 parts water, as well as 35–65 parts dry substance consisting of 10–30 parts mineral parts and 10–35 parts of combustible parts.

DETAILED DESCRIPTION OF PREFERRED EMBODIMENTS

Figure 1:
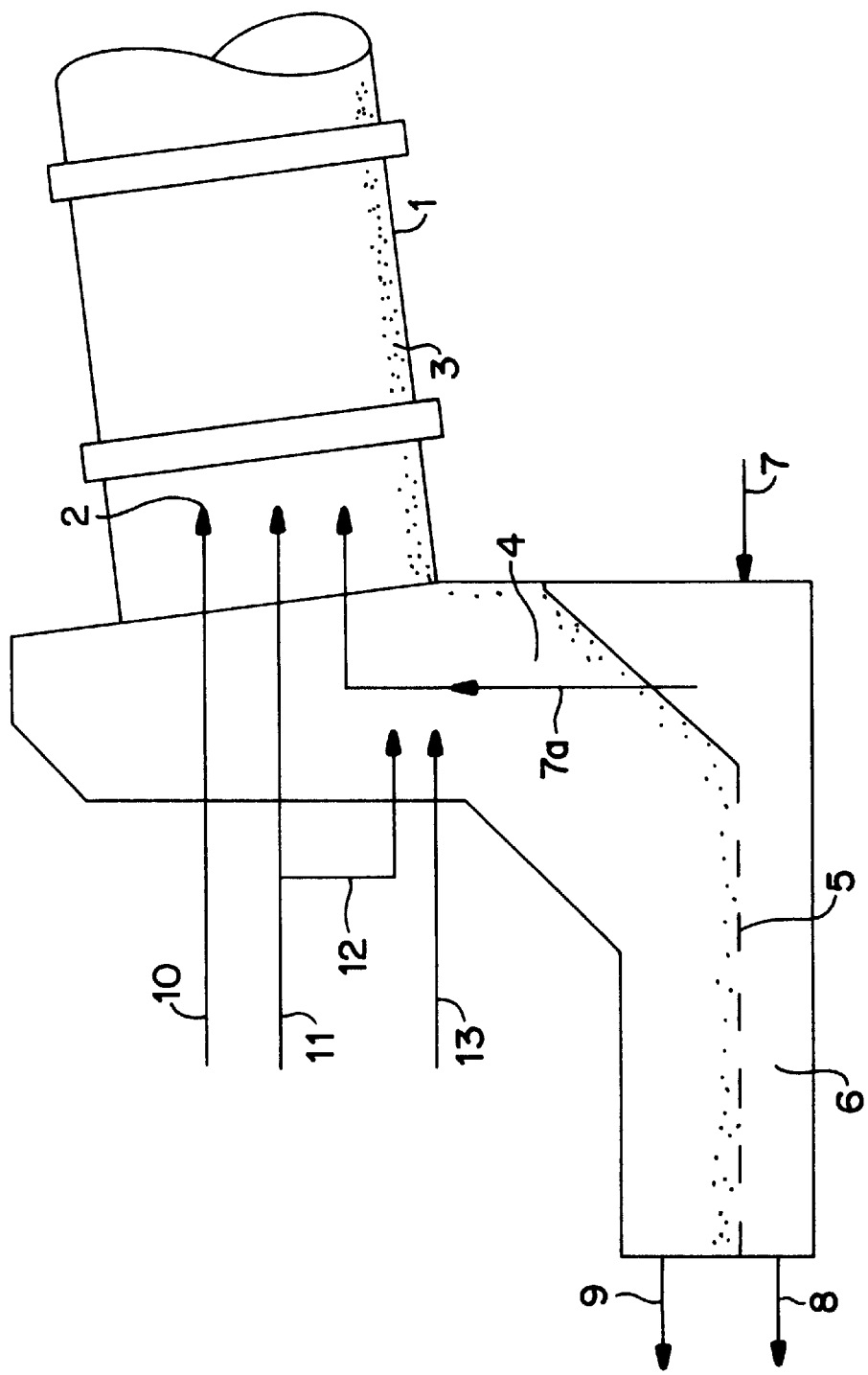
FIG. 1 is a schematic drawing of the last section of a rotary tube plant according to one embodiment of the invention.

From AT 394 711 B or EP 0 488 989 B1, it is already known, for the production of cement clinker in the case of the so-called secondary calcination, to introduce at the kiln entry low grade fuel, such rubber wastes, carbon-containing waste, oil sludge and the like, in order thereby to cover a part of the combustion energy needed for the calcination in the raw meal pre-heater. As is set out in this literature reference, fuels which are so wet that the heat of evaporation to be used does not suffice for the drying of the material or provides no substantial energy gain, are, in this connection, unsuitable. Therefore, it was suggested first to dry such low grade fuels with the heat of the kiln waste gases and to add the dried and, therefore, energy-rich residues to the secondary calcination.

In the case of this process, it proved to be problematical that the products to be dried can give off combustible and/or smelly gaseous components which, in spite of the cyclone separation, remain in the waste gas and must be burnt in a laborious post-purification or eliminated in another way. It has hereby proved to be advantageous that the mineral components contained in the residual materials, which correspond substantially to the components of the raw meal for the clinker production, are completely recovered and, on the other hand, the organic components serve for the obtaining of energy. It also proves to be disadvantageous that the waste air of the rotary kiln serving for the secondary firing in the kiln inlet is comparatively oxygen impoverished so that, in the case of the secondary calcination, such waste materials possibly do not burn completely and CO and hydrocarbons can get into the waste gases.

Therefore, there is the additional task so to carry out the working up of the residual materials in the case of the production of cement that the waste gases of the plant are as lean as possible in $NO_x$ and CO.

Surprisingly, this task is solved when one passes the residual materials containing water, mineral and combustible parts, without previous drying, not into the secondary firing or the raw meal supply but rather directly into the primary firing or, parallel thereto, introduces into the secondary air of the subsidiary heat-removing system of the rotary kiln. The high temperature of the fuel gases (1400–2000° C.) or of the discharged Portland cement clinker at this place (800–1200° C.) has the result that the portion of water contained in the introduced sludge evaporates explosively and divides up the contained solid components in very fine form so that the combustible parts burn quickly and completely in the excess oxygen. The mineral components are conveyed by the secondary air from the cooler into the clinker zone of the kiln. They there act like ash from the coal and participate in the clinker mineral formation. In this way, e.g. the residual materials originating from the paper industry, also in comparatively large amounts of up to 5 wt. %, calculated as dry substance, can be passed to the kiln meal feed without impairing the product quality of cement clinker with simultaneous careful use of valuable dumping space.

The invention makes it possible that a part of the amount of thermal energy and mineral necessary for the clinker production is covered by undried, untreated residual materials from the paper industry, whereas the remaining part is introduced in conventional manner with the primary raw materials lime and clay and fossil fuels, like coal.

recommended analysis comparison (in wt. %)

|  | hard coal fly ash i.a. | crude clay i.a. | residual material ash i.a. |
|---|---|---|---|
| burning loss | 3.0 | 10.4 | 4.3 |
| $SiO_2$ | 44.2 | 52.3 | 36.8 |
| $Al_2O_3$ | 33.2 | 24.7 | 24.1 |
| $Fe_2O_3$ | 8.4 | 6.1 | 1.1 |
| CaO | 5.2 | 4.4 | 28.7 |
| MgO | 2.5 | 0.1 | 3.4 |
| $K_2O$ | 2.8 | 0.8 | 1.2 |
| $SO_3$ | 0.7 | 1.1 | 0.4 |
|  | 100.0 | 99.9 | 100 |

The residual material ash corresponds to a lime-rich coal ash or lime-rich clay.

From DE 40 22 181 A1, it is already known that one can also introduce pre-comminuted synthetic material waste into the main or subsidiary heat-removing system of a cement kiln plant and can utilise it at this point with obtaining of energy and thus saving of primary fuel. Decisive for this is that the introduced synthetic material wastes are as dry as possible and thus possess a high calorific value. That it can be advantageous to introduce at this point comparatively wet, clay-containing and, if at all, a residual material having a comparatively low calorific value cannot be gathered from this literature reference.

A kiln system for the production of Portland cement clinker consists of a main heating system and a subsidiary heating system. By a main heating system, one understands the actual rotary kiln, by the subsidiary heating system, on the one hand, the fuel preheater, on the other hand, the fuel cooler of the subsidiary heat-removing system. Preheater and cooler serve for the heat exchange between fuel and fuel gas.

For the production of cement clinker, the natural minerals in lime (about 75%), clay (about 20%), as well as smaller amounts of quartz sand and iron ore, are needed. These materials are dried, finely ground, homogenised and heated and calcined in the kiln at about 1450° C. The gas temperatures in the hottest zone of the kiln thereby reach about 2000° C.

The primary raw material clay is a water-containing aluminium silicate of various crystallographic modifications (kaolin, illite, montmorillonite). Primary clays are used, in the first place, for the production of high quality ceramic products (porcelain, stoneware, fire-resistant material, sealing material for dumps etc.). Furthermore, considerable amounts go into the cement industry for the adjustment of hydraulic factors.

The clay-containing material used in the production of paper as filling material or for the surface finishing remains behind in the working up of waste paper, together with fine-fibred cellulose, as filter cake. It is suitable as replacement for the primary raw material clay.

The clay-containing and undried raw material replacing the clay of geogenic origin cannot be added to the raw material at the primary heater inlet or in the upper stages of the pre-heater because of its organic paper residual fibres. Because of the material moisture and the difficult handling properties thereby caused, as well as for the avoidance of gaseous emissions (CO, CH compounds), there comes into question only an introduction into the hot part of the main and/or subsidiary heating system of the kiln system in question.

The residual material can be introduced into the kiln system in various forms, depending upon the water content. There is possible not only the introduction via a burner nozzle into the kiln, i.e. the main heating system, but also into the cooler shaft between kiln and cooler, i.e. the subsidiary heat-removing system. In the case of residual materials with water contents of 35–50%, which are already capable of bubbling, the introduction can take place via the burner nozzle already present in the head of the kiln, also possible is a parallel second lance in the head of the cooler shaft. The residual material is thereby conveyed pneumatically into the kiln, the water evaporates, the cellulose burns in the main flame and the ash increases the ash content of the primary fuel, mostly coal. The ash in the fuel is a favourable component for the clinker mineral formation since it, consisting substantially of lime-rich aluminium silicates, contributes to a better sintering and melt phase formation in the high temperature zone of the kiln because of the low melting range. This thus favours the $C_3S$ formation, above all by resorption by free lime. The finely divided and highly reactive aluminium silicate of the residual material thus contributes to the improved clinker mineral formation.

By evaporation of the moisture contained in the residual material in the region of the main flame, the flame temperature tends to be lowered and, due to the increase of the inert proportion of ash, a slower running fuel oxidation in the main flame is achieved. Both bring about a worthwhile reduction of the thermally formed $NO_x$ in the main flame.

The addition of the residual material to the cooler inlet of the subsidiary heat-removing system is possible in the case of all moisture contents. The water evaporates in the region of the cooler shaft, the cellulose burns and the finely dispersed portions of ash conveyed with the hot secondary air into the kiln. The physical-chemical actions of the influence of the ash on the clinker mineral formation correspond to those of the addition via the burner nozzle.

In the accompanying FIG. 1 is schematically illustrated the last section of the rotary tube plant. The plant shows the rotary tube 1 in which the raw meals, consisting preponderantly of calcium oxide, aluminium oxide, silicon oxide and iron oxide, introduced at the non-illustrated inlet are calcined because of the high flame temperature produced by the burner 2 to give cement clinkers 3 which, because of their gravity and the rotary movement of the rotary tube, fall via the dropping shaft 4 of the subsidiary heat-removing system on to the cooling grid 5 of the cooler 6 where they are cooled by the air passed in via the cooler inlet pipe 7 from their starting temperature of about 800–900° C. to the end temperature of about 100–120° C. Via a clinker transport pipe 8, the clinker is then passed to a non-illustrated clinker room or to further working up. The cooler waste air is partly again passed into the open air via the waste gas pipe 9 and non-illustrated heat exchanger, the remainder so called secondary air 7a, which has heated to about 800–1000° C. on the hot clinkers, is passed via the dropping shaft 4 to the rotary tube and thus to the burner 2 where the oxygen contained is burned with the primary fuel introduced via the fuel inlet 10. As primary fuels, there are preferably used coal dust or oil. The residual material introduced according to the invention is either blown in in the form of fine particles via a pipe 11 in the region of the burner 2 or passed in via a pipe 12 above the dropping shaft 4 into the subsidiary heat-removing system.

Insofar as the residual material is too wet (>50%) in order to be blowable, it is also introduced into the dropping shaft 4 via a solid material introduction 13, for example, a screw conveyer or a transport belt.

As was already said above, the portion of water contained in the residual material evaporates practically instantaneously explosively in the case of the bringing together with the hot clinkers or the hot secondary air 7a in the rotary tube so that the portions of solid material are very finely divided. Combustible portions are thereby burned quickly and completely not only in the subsidiary heat-removing system but also in the rotary tube itself on the basis of the high portion of oxygen of the primary air and of the high temperature of over 800° C. sufficient for an ignition. The finely dispersed mineral components of the residual material remaining behind in the case of evaporation and burning are carried with the secondary air 7a into the rotary tube where they mix with the raw meal and also removed as clinker. The portion of ash proportionately markedly increases the clinker production.

The following exemplary course of the process is to explain the invention in more detail.

The mineral material—especially clay-containing residual material of the paper industry is obtained directly from the producer. After unloading into the daily storage, the residual material is passed to a mechanical or pneumatic conveyer.

From the mechanical conveyor, the material is conveyed continuously with conveying units into the kiln. It is thereby, for example, a question of a chain, screw or belt conveyor with drives continuously regulatable in the speed of revolution, whereby the amount conveyed can be correspondingly varied. The conveyor throws off the conveyed material into chutes equipped with non-return flaps which in turn introduce the residual material directly into the gas stream between main and subsidiary heat-removing system (cooler).

From the pneumatic conveyor, the material is continuously conveyed into the gas stream (secondary air 7a) between main and subsidiary heat-removing system (cooler) or directly into the main heating system via the coal burner.

In long-term experiments, with the help of the continuously working operational emission supervision, it was demonstrated that by the use of the material, in comparison with the operation without residual material, no additional or other emissions or in some other way no dangers, disadvantages or annoyances arise for the general public or neighbourhood. On the contrary, the $NO_x$ emissions clearly decrease. Depending upon the water content of the residual material, its calorific value and the amount used, the primary fuel requirement decreases.

In the case of the material and thermal utilisation of the undried and untreated residual materials in the kiln, neither additional dust nor slags are obtained as waste products.

Especially in the case of very high water-containing sludges, the content of burnable components contribute preponderantly only to a compensation of the heat of evaporation so that no or only small amounts of primary fuel are saved. However, the great advantage of this carrying out of the process lies in the fact that, by the evaporated water, the combustion temperature of the flame in the rotary tube is reduced and, simultaneously, this becomes longer and more uniform. This has the advantage that the $NO_x$ formation is significantly lowered, i.e. from an average of 1200 mg/Nm$^3$ to about 700 mg/Nm$^3$, whereas the CO values with 500 mg/Nm$^3$ are practically not changed by the addition of residual material.

Figure 2:
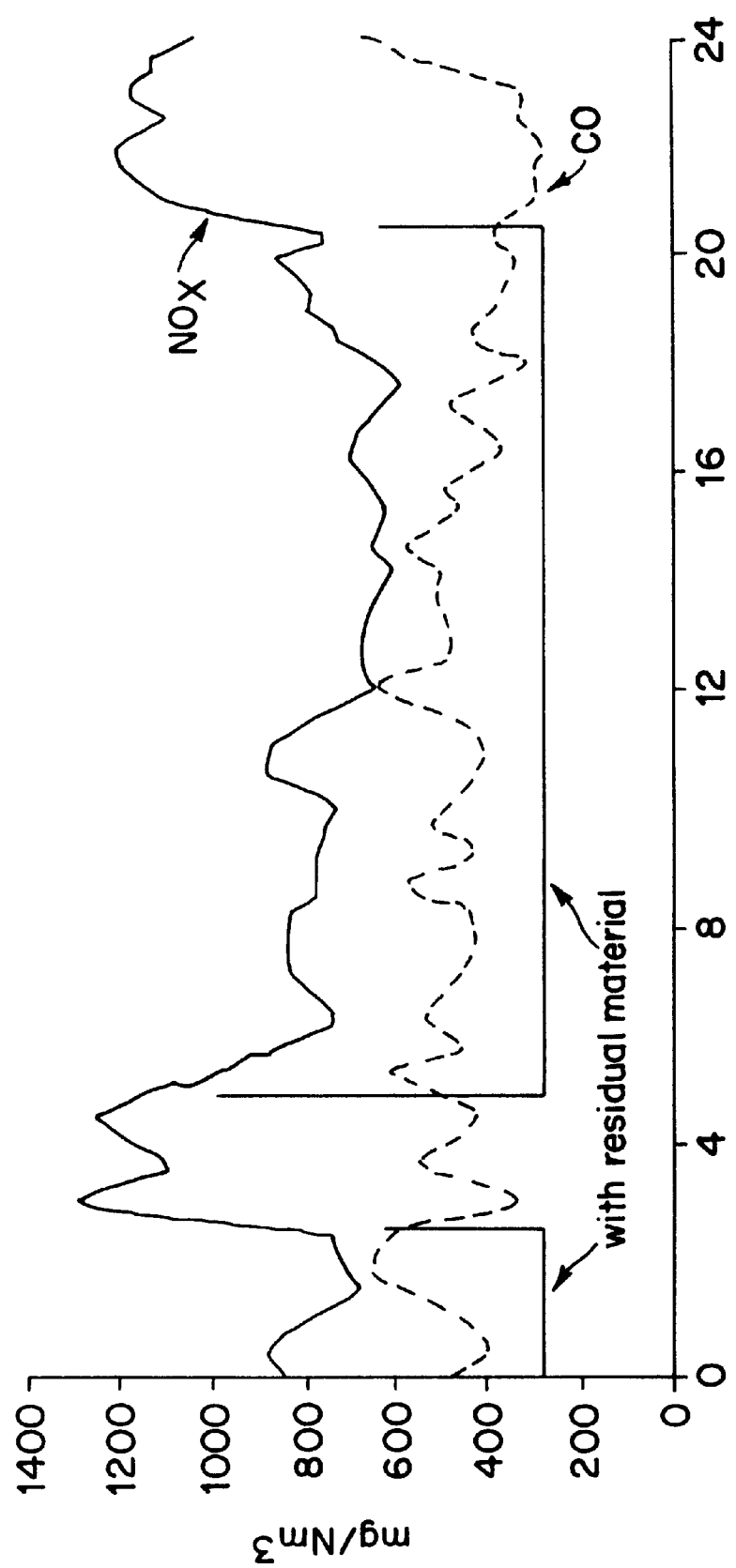
FIG. 2 is graphical representation showing emissions output over a 24 hour period.

FIG. 2 shows the course of the curves in question over one day, whereby, in the 3rd to 5th and after the 20th hour, the introduction of residual materials was interrupted.

List of references 1. rotary tube
2. burner
3. clinker
4. dropping shaft ⎫
5. cooling grid     ⎬ subsidiary heat-removing system
6. cooler           ⎪
7. cooler air inlet ⎭
8. clinker transport line
9. waste air line
10. fuel inlet
11. line
12. line
13. solid material inlet

What is claimed is:

1. A process for the production of Portland cement clinker in cement kilns and for the material and thermal utilization of residual materials containing water, minerals and combustible parts comprising:

introducing, without previous drying, the residual materials into a cement plant with a conveyor into a shaft between a clinker cooler and a kiln head;

taking up the residual materials by secondary air having a temperature of about 800–1000° C. and conveying the residual materials to the kiln; and introducing the taken up residual materials into the kiln, wherein the residual materials have a content of 65–35 parts water, as well as 35–65 parts dry substance consisting of 10–30 parts mineral parts and 10–35 parts of combustible parts.

2. A process according to claim 1, wherein the residual materials are from the paper industry.

3. A process according to claim 1, wherein the residual materials are waste from the recycling of waste paper.

* * * * *